UNITED STATES PATENT OFFICE.

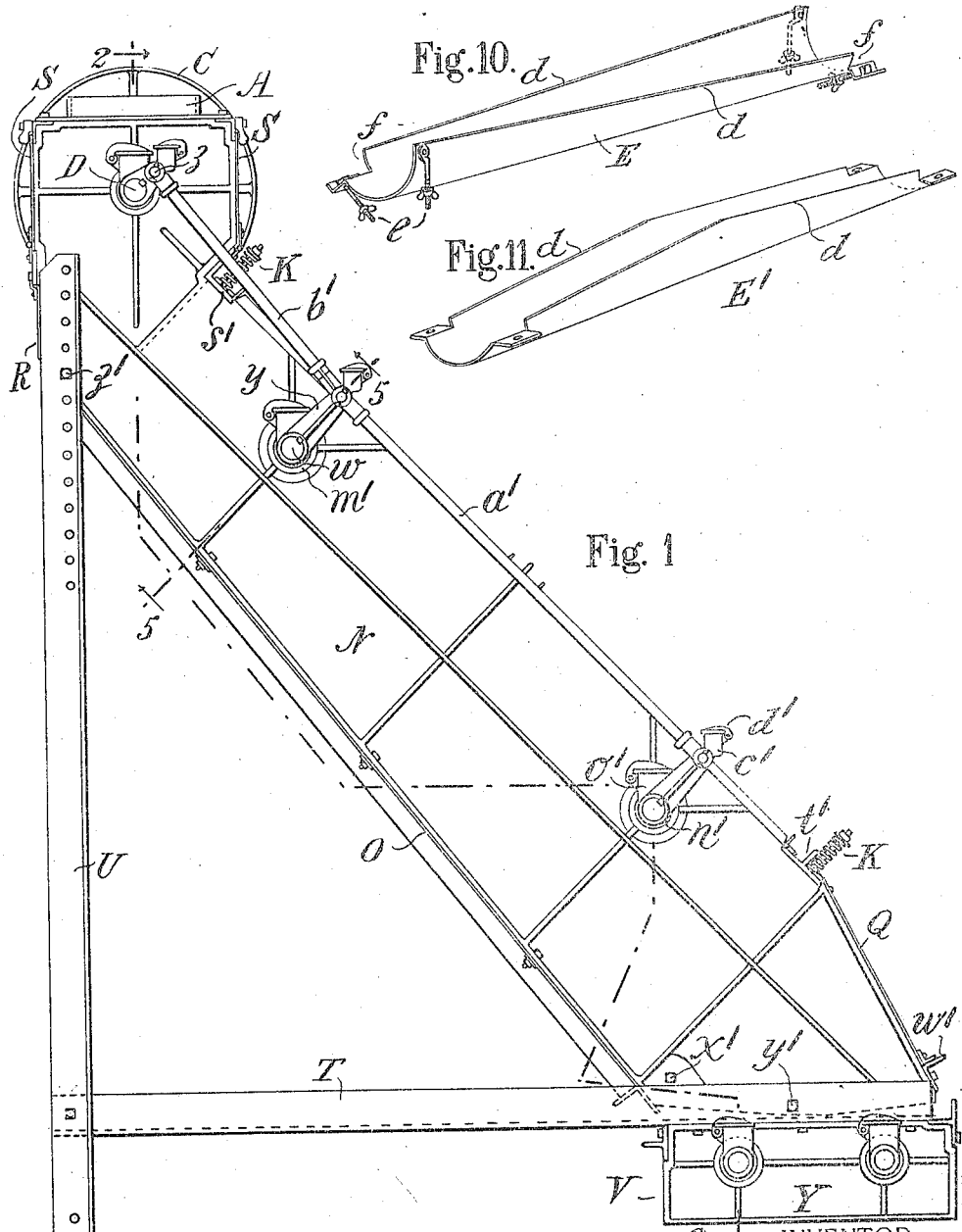

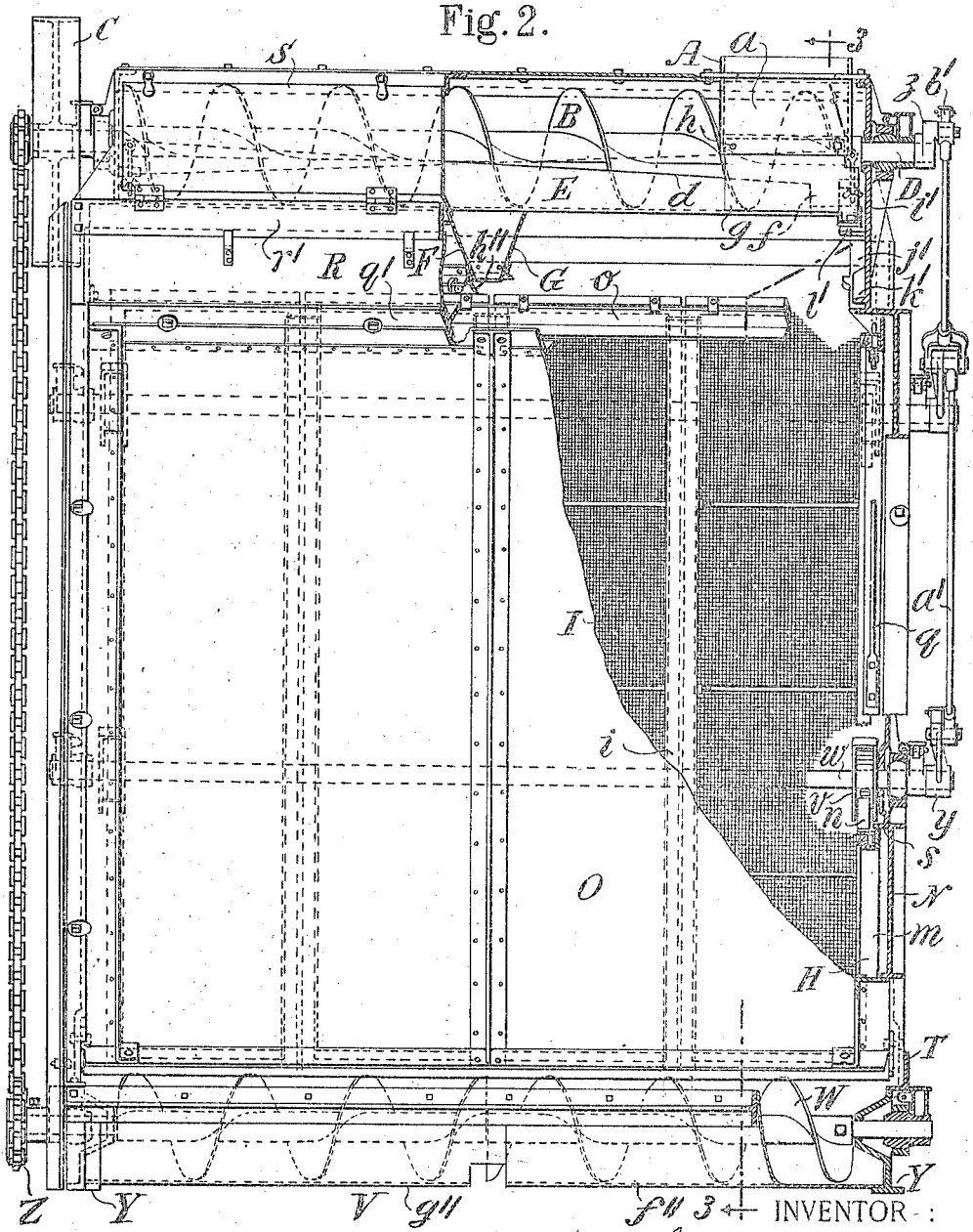

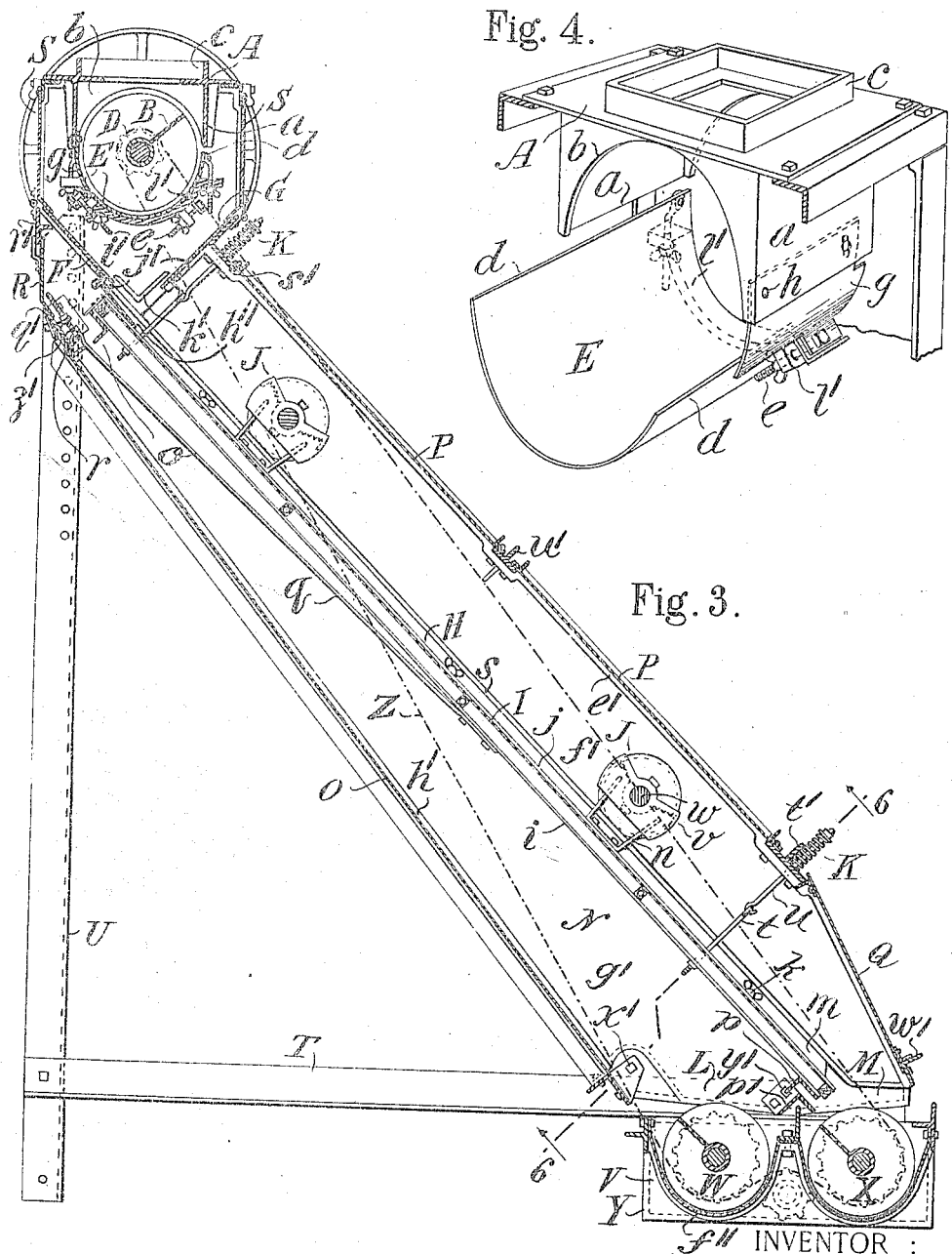

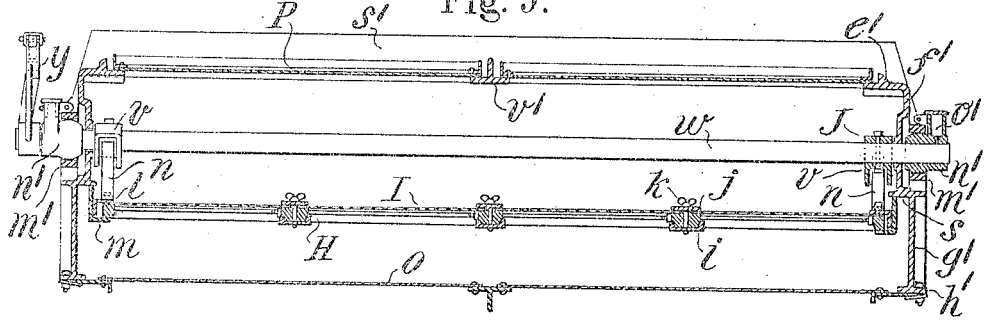
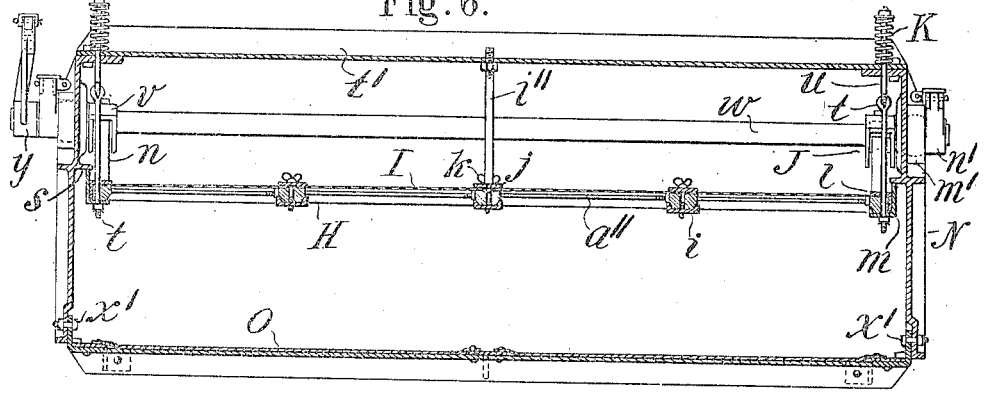
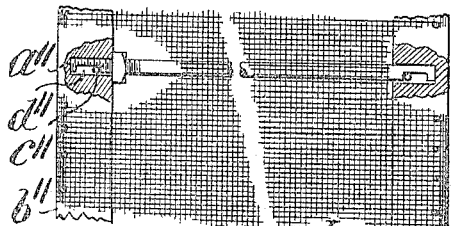
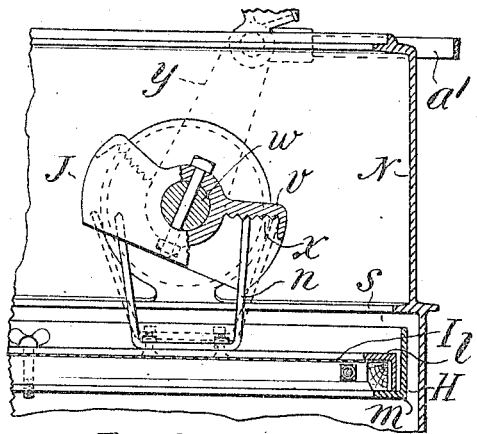

GEORGE HOLT FRASER, OF NEW YORK, N. Y.

FEED-REGULATOR FOR SCREENING AND OTHER APPARATUS.

1,202,376.  Specification of Letters Patent.  Patented Oct. 24, 1916.

Application filed September 24, 1908, Serial No. 454,604. Renewed March 7, 1916. Serial No. 82,750.

*To all whom it may concern:*

Be it known that I, GEORGE HOLT FRASER, a citizen of the United States, residing in the borough of Brooklyn, county of Kings, city and State of New York, have invented certain new and useful Improvements in Feed-Regulators for Screening and other Apparatus, of which the following is a specification.

This invention relates to feeders for such apparatus as screens for separating coarse from fine materials, and aims to provide certain improvements therein.

The invention is especially applicable to inclined screens of the class in which the material to be screened is distributed across the upper end of the screen by a screw conveyer and flows down the screen while the latter is vibrated to prevent clogging. Such inclined screens are usually adjustable to vary the steepness of the screen, and are usually supported by springs and vibrated by eccentrics or hammers.

This invention aims to provide a feeder for screens of this type which shall be more nearly universal in adaptation to the particular requirements of use, more easily accessible for adjustment and renewal, and more effective in operation, than heretofore.

To this end the invention provides various improvements which will be hereinafter more fully set forth with reference to the accompanying drawings, in which,—

Figure 1 is a side elevation of the preferred form of my invention; Fig. 2 is a rear elevation thereof partly broken away to show the machine in section on substantially the planes of the line 2—2 in Fig. 1; Fig. 3 is a vertical section thereof cut on the line 3—3 in Fig. 2 and looking in the direction of the arrow; Fig. 4 is a fragmentary perspective view of the feed hopper and trough; Fig. 5 is a cross-section cut on the line 5—5 in Fig. 1 and looking in the direction of the arrow; Fig. 6 is a cross-section cut on the line 6—6 of Fig. 3 and looking in the direction of the arrow; Fig. 7 is a fragmentary face view of one of the screen frames partly broken away and on a larger scale; Fig. 8 is a fragmentary section thereof; Fig. 9 is a fragmentary sectional view of the knocking device; Fig. 10 is a perspective view of the end feed trough; and Fig. 11 is a perspective view of the center feed trough.

Referring to the drawings, A is the feed hopper, B the conveyer for distributing the feed, C the drive pulley, D the drive shaft, E the feed trough, F the rear feed plate, G the front feed plate, H the screen carrier, I the screens, J the vibrators, K the springs, L the fine outlet, M the coarse outlet, N the side walls, O the bottom wall, P the top doors, Q the lower door, R the back door, S the front and rear doors, T the feet, and U the legs.

The material to be screened enters the hopper and is pushed along the trough by the revolving conveyer, which throws it over the edge of the trough as it travels, so that it falls onto the feed plate in a substantially uniform quantity at all points throughout the width of the screen. The material slides down the feed plate and onto the screen cloth, down which it flows, the fine material falling through the meshes of the screen and the coarse material sliding down the upper face of the screen. The fine material flows down the bottom to the outlet L, and the coarse material flows off the screen and passes through the outlet M. The screen is vibrated to prevent clogging, and is adjusted up or down on the legs U to the desired steepness.

According to one feature of improvement the hopper A is a casting having flanges $a$ depending at front and at rear of the conveyer, side flanges $b$ above the conveyer, and top flanges $c$ surrounding its inlet for receiving the end of a chute, and is adapted to be placed at either end or at the middle of the separator and to receive feed from any direction.

Another feature of improvement consists in providing the feed trough with discharge edges $d$ at both its front and rear sides, which edges are inclined from the feed point downwardly toward the end and are adjustable in inclination so that the angle of the edge may be suited to cause a uniform discharge of material throughout the length of the trough. Preferably the trough is made with reverse inclined edges, so that when the hopper is at one end and the conveyer revolved in one direction, the material can be discharged over the rear edge of the trough, and when the hopper is at the other end and the revolution of the conveyer is reversed, the material can be discharged over the front edge of the trough. I prefer to construct the trough of a single sheet curved to suit the conveyer, and sufficiently flexible to permit its ends to be relatively distorted for adjusting the angularity of its edges, and to effect this adjustment by retaining screws $e$ which hold it in place. At each end at the low side the trough is cut out to form an outlet $f$ for any material that has not been thrown over the edge, and this outlet at the hopper end is closed by a shield $g$ pivoted to the hopper at $h$ and engaged by the adjacent screw $e$, which shield prevents material falling through the hopper from escaping at this side of the trough. With this construction it is possible to place the hopper at either end of the trough and run the conveyer in either direction, so that it will feed the material over the edge which inclines downwardly from the hopper, thus making it immaterial whether the drive is right hand or left hand.

According to another feature of improvement I provide two feed plates beneath the conveyer, the rear plate F receiving the material from the trough E when it is discharged over the rear edge of the trough and directing it forwardly down onto the screen, and the front plate G receiving the material when it is discharged over the front edge of the trough and directing it backwardly onto the plate F, from which it slides onto the screen, so that the material is delivered to the screen in the same manner whether the discharge is over the front or the rear edge of the feed trough. The plates F and G incline toward each other in order to bring the material always to the same place for delivery to the screen. When the material is discharged over the front edge of the trough, to prevent the fall of the material directly onto the screen, the hinged edge $h''$ of the plate F will be used on the rear plate, but when the material is to be fed over the rear edge of the trough the plates will be reversed, or the hinged edge of the plate F will be unhooked and fastened on the plate G, where it will hang, thus enabling the material to flow onto the screen nearer the uppermost end thereof. This hinged edge rests on the screen frame and is vibrated thereby.

The screen frame H consists of an open frame having grooved slideways $i$ in which the various sections of the screen I slide and by which they are guided. The adjacent edges of screen sections are engaged by clamping strips $j$ held down by screws $k$ passing between the sections and screwing into the slideways. At the sides I provide clamping angles $l$ which fit against the side angles $m$ of the screen frame and carry the fingers $n$ by which the frame is depressed. The guides $i$ and side angles $m$ are united by a top angle $o$ and a bottom angle $p$, and the frame is adjustably maintained in position by hanging rods $q$ hooking into screw eyes $r$ so that the frame is free to move up and down. The screen frame is held up against a stop wall $s$ by the springs K through the medium of spring rods consisting of adjustable eyes $t$ passing through the sides $m$, and adjustable hooks $u$ passing through the front and carrying the springs K. Thus the frame is elastically supported so that it can be depressed, and when released will be drawn up suddenly against the stop wall by the springs, and will thus be given an abrupt upward jolt to free the screen from any clogged material. Unhooking the spring rods and the supporting rods $q$ frees the spring frame for removal. When thus freed it will drop down until supported by its lower bar $p$, when it can be swung down like a door and removed either through the front or rear.

Several features of improvement are embodied in the agitating devices J, which consist of oscillating knockers $v$ mounted on rocker shafts $w$ and having walls embracing the fingers $n$, and serrated striking faces which engage these fingers for depressing the screen. The faces $x$ and fingers $n$ are relatively disposed to permit variation of the depressing movement by adjusting the fingers toward or from the shaft by bending them or otherwise, so that when the fingers are in one position the maximum movement will occur, and when in another position the minimum movement will occur, as indicated in dotted lines in Fig. 9. This device aims to depress the frame with a diminishing speed and to release it with an increasing speed, so that the screen will receive a sharp upward blow against the wall $s$ when released. This is accomplished by oscillating the knocker $v$ by the arm $y$ which is oscillated from a crank $z$ on the drive shaft D, the parts being so disposed that the knocker engages the finger as the crank approaches the dead center, and releases the finger as the crank is moving toward the full throw position, the lost motion between the knocker and finger being arranged so that the knocker will be ineffective during its rapid movements, and effective during its slow movements, thus avoiding too great a vibration of the spring frame and preventing too much strain on the knocker. The knocker arms $y$ are connected by a connecting rod $a'$, and are connected with the crank by a pitman $b'$. Each arm has an integral oil cup $c'$ closed by a cover $d'$, and the pitman has a similar oil cup at its crank end.

Another feature of improvement consists in constructing each end of the casing of a single casting having an inclined top flange $e'$, a wall $f'$ extending across from to the wall $s$, an outwardly offset wall $g'$ below the wall s, and a lower edge or flange $h'$ of greater angularity than the wall s, and at its upper end with an inwardly projected portion $i'$ having front and rear flanges $j'$ for supporting the plates F and G, and a deflecting flange $k'$ at the intersection of these flanges for overlapping the plates at this point and deflecting material inwardly toward the screen. The trough bracket $l'$ is formed or cast on the inner face $i'$ to support the feed trough, and has ears for receiving the adjusting screws $e$. Externally the side N has cylindrical brackets $m'$ spaced apart from the wall to leave an air space for the escape of dust, in which brackets fit bearings $n'$ having portions shaped like a segment of a sphere, so that they may oscillate in any direction to aline themselves with the shafts they carry. These bearings have integral oil cups $o'$ provided with lugs for attaching them to the wall.

The casing is composed of two ends N united by a rigid bar $p'$ at the bottom and a rigid T-bar $q'$ at the top, which bars space the ends and determine their positions. The bar $p'$ makes the division between the fine outlet L and the coarse outlet M, and acts as a stop by engaging the lower bar $p$ of the screen frame to prevent the frame from falling downwardly when released, and to support its lower end when the frame is being swung up and down. The bar $q'$ supports the screen frame through the rods $q$. A T-bar $r'$ supports the feed plate F and carries the adjacent top door S, the lower edge of which door is hinged to this bar and bent inwardly over the plate to prevent leakage above the latter. The back door R slides up under the bar $r'$ and has an inwardly bent end which rests on the inner face of the bar $q'$. The front plate G is supported by an angle bar $s'$ which is bolted to the top edge of the sides N and carries the upper springs K. The lower springs K are carried by a T-bar $t'$ which is bolted to the upper edges of the ends near their bottom. The top covers P rest on the bars $s'$ $t'$, and intervening cross bars $u'$ and $v'$, there being preferably four of these covers. The lower cover Q rests on the bar $t'$ and on a front bar $w'$. The bottom O is hinged at $x'$ in a cavity formed in the inner face of the side, and is fastened against the edges of the sides and against the under side of the bar $q'$, so that this bottom can be swung down to give access beneath the screen.

The entire casing is pivotally mounted on a bolt $y'$ as a fulcrum, which connects it to the feet T so that it can be swung up or down to vary the steepness of the screen. At its upper end it is adjustably connected by the bolt $z'$ to the leg U, which has a row of holes, in any one of which this bolt may be passed to hold the casing at the desired angle.

Another improvement consists in constructing the screen frame with extending rods $a'''$ fastened in sockets in the side bars $b''$, and of such length that the frame can not be distorted inwardly to less than its minimum width, but adapted to spread the frame until the screen cloth is adjusted to the proper tightness. The bars are adjustably held in the sockets by nails $c''$ engaging notches $d''$ which prevent the frames from bending apart sufficiently to drop the bars. One end of each bar is screwthreaded and has a nut $e''$ which can be screwed outwardly to spread the bars and stretch the cloth. The nut can then be held against unscrewing by driving a nail into the bar near it.

As thus far described the screen apparatus is adapted for any of the ordinary uses of such devices, but when it is desired to collect the product at either side or the middle of the screen instead of discharging it throughout the width thereof, I provide a supplemental base V having a conveyer W beneath the fine outlet and a conveyer X beneath the coarse outlet, which conveyers have bearings in castings Y and are driven from the shaft D by a sprocket chain Z. These conveyers have troughs consisting of two pieces $f''$ and $g''$, the latter having a notch in one end for an outlet. These two pieces are arranged end to end with the notch in the center or at either end of the conveyer, according to where discharge of the product is desired. The conveyers are identical with the feed conveyer B, except that one is a right hand conveyer and the other a left hand conveyer, and each is made in two equal pieces with the shafts extending entirely through them to support the adjacent ends, so that if central discharge is desired for each lower conveyer, this can be accomplished by putting a piece of right hand and a piece of left hand conveyer on each shaft, as shown in Fig. 2, whereas if end discharge is desired, like pieces of conveyer will be put together. Should it be necessary to put the feed hopper at the center, two reverse pieces of conveyer will be used in the feed trough, and the feed conveyer will be used below. In such case it will be necessary for one of the lower conveyers to have an end discharge and the other a central discharge. When the feed hopper is used in the center, the supplemental feed trough E' will be substituted for the trough E, as the supplemental trough has edges inclined downwardly from the center toward the ends on each side, so that it can be used with a right and left conveyer to distribute in both directions and discharge over the front or rear edge as desired. To move the feed hopper from one end to the other or to the center, it is only necessary to shift it and the top plate accordingly, this plate being adapted to fit in either position and be cut in the center and cover the two ends when the hopper is placed centrally.

In operation, the apparatus may be adjusted to suit any requirements as to feed, discharge, angularity or extent of vibration. It is accessible from front, rear, top or bottom. It can be ventilated by opening the back door R and the front door Q, or either of them. The greater steepness of the bottom will insure downflow of the fine material, even when the screen proper is adjusted below the usual steepness. The screen frames can be removed individually through the front or rear, or through the bottom or top.

For packing, the feet and legs can be folded against the body, and great compactness obtained. Assembly and disconnection can be quickly effected, and adjustment of either spring pressure or extent of vibration is easily obtained. The drive pulley and vibrating arms can be placed on either side, and the oscillating bearings will rock in their brackets to compensate for any skewing of the frame due to uneven setting.

The various details of construction, arrangement and combination shown each constitute a feature of improvement and a part of my invention, and it will be understood that I do not limit myself to the particular adaptation herein set forth as constituting the preferred form of my invention, since the same may be availed of in whole or in part, according to such modifications as the judgment of those skilled in the art may dictate, without departing from the spirit of my invention.

I prefer to also use an adjustable knocking stop rod *t''* over the middle of the screen. This has the same effect as the flanges *s*.

While I have herein shown and described the screen set forth the same is not claimed in this application, being the subject matter of claims in my application Serial Number 33,294 of 1915, filed June 10, 1915, which is a division of this application.

I claim as my invention:—

1. In combination, a reversible horizontal distributing screw conveyer, means for revolving it, a trough or member beneath and extending longitudinally of said conveyer and having longitudinal discharge edges at each side thereof, and means spaced apart from and extending longitudinally of each side of said trough or member for permitting material to flow over either discharge edge thereof and causing such material to flow beneath said trough in a thin wide stream.

2. In combination, a screw conveyer for distributing material, means for revolving it, an open top trough or member extending longitudinally of said conveyer consisting of a curved sheet beneath and adjustable around said conveyer having an inclined longitudinal discharge edge at the side of the latter, and means for adjusting said trough about the axis of said conveyer to raise or lower said edge.

3. The combination with a reversible screw conveyer for distributing material, of a trough for said conveyer having at its front and rear sides edges of reverse inclination over either of which the conveyer may discharge according to its direction of rotation.

4. In combination, a screw conveyer for distributing material, means for revolving it, a trough or member extending longitudinally of said conveyer consisting of a curved sheet having an inclined integral longitudinal side discharge edge, and means for adjusting said trough to vary the inclination of said edge.

5. In combination, a screw conveyer for distributing material, means for revolving it, a trough or member extending longitudinally of said conveyer consisting of a flexible sheet having a longitudinal edge at the side of said conveyer over which material is discharged thereby, and means for twisting said sheet to vary the inclination of such edge.

6. In combination, a reversible horizontal distributing screw conveyer, means for revolving it, a trough or member extending longitudinally of said conveyer and having at its front and rear sides longitudinal discharge edges across either of which said conveyer may discharge according to its direction of rotation, and means extending longitudinally of and spaced apart from the respective discharge edges of said trough for causing material flowing across either edge thereof to flow away from said trough in a thin wide stream.

7. In combination, a reversible horizontal distributing screw conveyer, means for revolving it, a trough or member extending longitudinally of said conveyer and having at its front and rear sides longitudinal discharge edges across either of which said conveyer may discharge according to direction of rotation, and a casing for such parts having front and rear walls opposite, extending longitudinally of, and spaced apart from, said edges respectively and permitting material flowing across either of said edges to pass between said casing and trough at either side of the latter.

8. In combination, a reversible horizontal distributing screw conveyer, means for revolving it, an adjustable trough or member beneath and extending longitudinally of said conveyer and having at the front and rear sides thereof inclined longitudinal discharge edges over either of which said conveyer may discharge according to its direction of rotation, means extending longitudinally of and spaced apart from the rear edge of said trough for causing material flowing over such edge to travel in a forward direction in a thin wide stream.

9. In combination, a reversible horizontal distributing screw conveyer, means for revolving it, a trough or member extending longitudinally of said conveyer and having at its front and rear sides inclined discharge edges, and means longitudinally of and spaced apart from the respective discharge of said trough for permitting material to flow over either such edge and causing it to flow away therefrom in a thin wide stream.

10. In combination, a screw conveyer for distributing material, means for revolving it, a trough or member extending longitudinally of said conveyer and having a longitudinal discharge edge at the side thereof and consisting of an arc-shaped sheet, a second arc-shaped sheet extending longitudinally of and embracing the exterior of said trough or member, and means for adjusting said sheets about the axis of said conveyer.

In witness whereof, I have hereunto signed my name in the presence of two subscribing witnesses.

GEORGE HOLT FRASER.

Witnesses:
FRED WHITE,
THOMAS F. WALLACE.